April 7, 1942.  J. BERGE  2,278,640
PROPELLER AND DEICING MEANS THEREFOR
Filed April 26, 1940
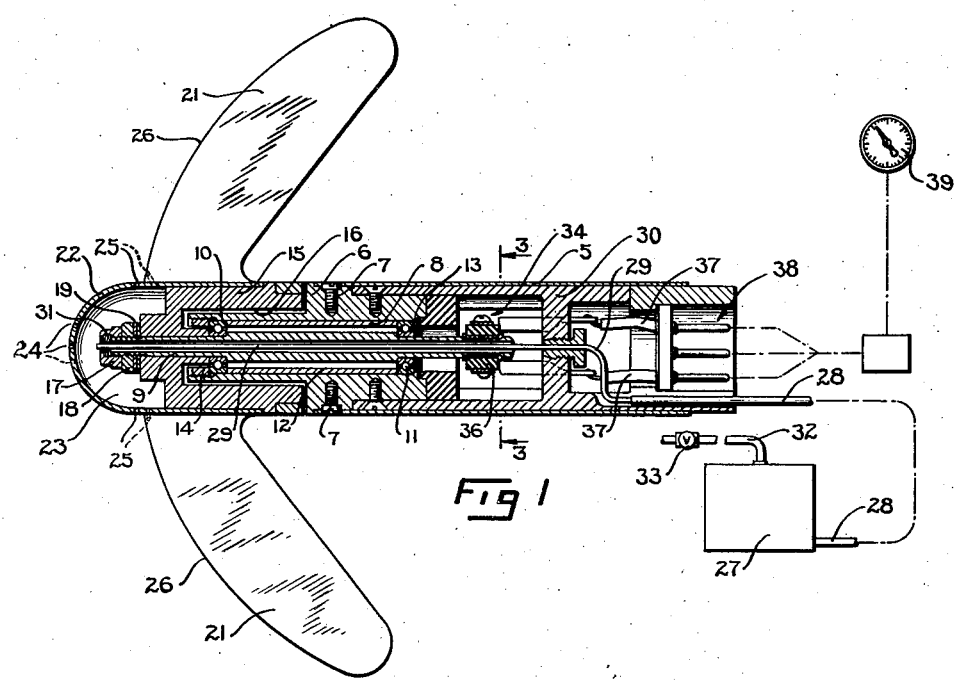
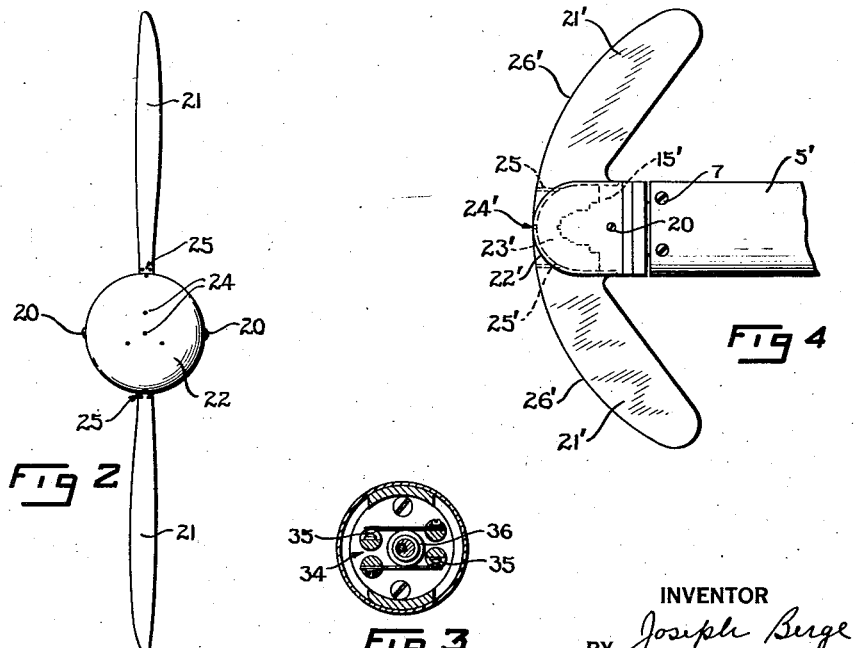
INVENTOR
BY Joseph Berge
F. Bascom Smith
ATTORNEY Patented Apr. 7, 1942

2,278,640

UNITED STATES PATENT OFFICE 2,278,640

PROPELLER AND DEICING MEANS THEREFOR

Joseph Berge, East Orange, N. J., assignor to Jaeger Watch Company, Inc., New York, N. Y., a corporation of New York Application April 26, 1940, Serial No. 331,782

6 Claims. (Cl. 244—134)

This invention relates to fluid driven apparatus, and more particularly to wind driven propeller means adapted for use in measuring wind velocity or the like.

One of the objects of the present invention is to provide a novel propeller unit comprising means for preventing ice from accumulating thereon to such an extent that the operation of the unit will be materially affected.

Another object of the invention is to provide a propeller unit in combination with means for emitting an anti-freeze fluid, the nose portion and blades of said unit being shaped in a novel manner to facilitate the coating of the surfaces thereof with said anti-freeze fluid.

Still another object is to provide novel apparatus for measuring the velocity of the wind relative thereto.

A further object is to provide novel apparatus for measuring wind velocity or the like which is so constructed as to minimize the formation of ice and the effects of ice formation thereon.

A still further object is to provide a propeller unit which is novelly constructed so that ice forming thereon is thrown off before it reaches the stage at which it materially affects the operation of the unit.

Another object of the invention is to provide a novel combination of ice prevention means and a propeller unit whereby a more efficient flow of anti-freeze fluid from said means onto the outer surfaces of said unit is attained.

Another object is to provide a propeller unit which has the nose portion and blades thereof so constructed as to minimize the accumulation of ice thereon.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

In the drawing, wherein like reference characters refer to like parts throughout the several views, Fig. 1 is a partially diagrammatic side elevation, partly in section and with parts broken away, illustrating one form of apparatus embodying the invention;

Fig. 2 is a front elevation of the propeller unit shown in Fig. 1;

Fig. 3 is a section taken on line 3—3 of Fig. 1; and,

Fig. 4 is a side elevation with parts broken away of another embodiment of the propeller unit.

The embodiments of the invention illustrated, by way of example, in the drawing is in the form of wind driven propeller units adapted to actuate suitable indicating instruments calibrated for indicating the velocity of the wind and combined in a novel manner with means for applying an anti-freeze liquid to the surfaces thereof during operation when the climatic conditions are such that ice tends to form thereon. The units shown may be used, for example, to determine and indicate the velocity of an aircraft through the air. When used for this purpose, the propeller unit and the mechanism driven thereby are mounted on the wing or other suitable part of the aircraft where said unit will be subjected to the proper air currents, and the calibrated indicating instrument controlled thereby is mounted on the instrument panel of the aircraft. The embodiment illustrated in Fig. 1 comprises stationary supporting means adapted to be secured to an aircraft (not shown) for rotatably supporting the novel propeller unit comprehended by the invention and to be hereinafter described. Said supporting means, as shown, comprises a tubular shell or casing 5, having a supporting block 6 fitted into the forward end thereof and held in place by any suitable means, such as set screws 7. Block 6 is provided with a central bore 8 wherein a hollow shaft 9 is rotatably supported on roller or ball bearings 10 and 11, said bearings being spaced from one another by a spacer tube 12 and held within block 6 by an internal shoulder 13 therein and a nut 14 threaded into the forward end of said block. Shaft 9 is provided with an enlarged portion between bearings 10, 11 whereby the same is held against axial movement.

The novel propeller unit comprehended by the invention is so constructed as to minimize the possibility of ice forming or accumulating thereon during operation, and in the form illustrated comprises a hub member 15 adapted to fit onto the forward projecting end of shaft 9 for rotation therewith and having an enlarged bore 16 for loosely receiving the reduced forward portion of supporting block 6. Hub member 15 butts against the inner race of bearing 10 and is held on shaft 9 by a nut 18 threaded onto said shaft. One or more gasket washers 19 may be interposed between nut 18 and member 15 to provide a fluid tight joint for a purpose to hereinafter appear.

Slidably mounted on hub member 15 and secured thereto by set screws 20 is a novel propeller comprising a pair of diametrically disposed blades 21, which are preferably integrally cast with an axially disposed forwardly projecting hollow nose portion 22. The latter has a close fit on hub member 15 and cooperates therewith to form a fluid chamber 23 to which an anti-freeze solution may be supplied at the will of an operator and under pressure by means to be hereinafter described. The relatively thin wall of chamber 23 is provided with a plurality of fluid emitting orifices 24 and 25 for supplying fluid from said chamber in the leading surfaces of said propeller unit at points adjacent the forwardmost part of nose 22 and adjacent the bases of the leading edges of blades 21.

In order to insure that the outer surface of nose 22 will be substantially coated with anti-freeze fluid flowing from orifices 24, said nose is preferably hemispherical in shape and said orifices are located one at the axis of rotation and others in close proximity thereto. The diameter of said orifices in one suitable embodiment ranges from .010 inch to .025 inch. The fluid emitted from orifices 24 is carried by the wind along the surface of nose 22 and tends to prevent the formation of ice thereon. Under severe conditions, the moisture in the air may mix with the anti-freeze fluid to such an extent that some ice will form on nose 22, but such ice is generally thrown off by centrifugal force generated as a result of the rotation of the propeller unit and by the pressure exerted on the ice by the passing wind currents before said ice materially affects the operation of the unit.

For the purpose of insuring against formation of ice on propeller blades 21, said blades are provided with a substantial sweep-back which in one suitable embodiment approaches approximately 45 degrees. As shown, the leading edges 26 of the propeller blades are curved rearwardly throughout substantially the entire length thereof to such an extent that the wind passing the propeller will tend to carry the fluid ejected from orifices 25 along said leading edges, thereby preventing the formation of ice thereon. In side elevation, the leading edges 26 of blades 21 trace paths which being substantially at the base of hemispherical nose portion 22 and approximate the flow of a drop of anti-freeze fluid discharged under pressure from orifices 25. Said fluid is carried outward by pressure exerted thereon and by the action of centrifugal forces and backward by the air flow past the blades. It has been found in practice that a sweep-back of from 30 to 45 degrees is suitable. In one embodiment, the radius of the leading edge 26 of each blade is approximately one and one-fourth times the distance of the outermost portion of each blade from the axis of rotation of the propeller unit.

By thus substantially prohibiting the formation of ice on the propeller blades, it has been found that any ice which may form on the surface of nose 22 builds up radially from the latter and not along or in contact with the leading edges of the blades. Since this ice formation does not adhere to the blades and depends solely on its adherence to the curved surface of nose 22 for support, the same will be thrown or broken away by the action of centrifugal force before reaching such proportions as to materially hinder the operation of the propeller. Preferably, some of the orifices 25 extend radially at the bases of blades 21, while others are drilled from or near the leading edges 26 of said blades into chamber 23, either radially or at an angle to the axis of rotation. In one suitable embodiment, orifices 25 have a diameter of approximately .020 inch. It will, of course, be understood that the diameters of orifices 24 and 25 will depend to some extent upon the size of the propeller unit, the viscosity of the anti-freeze liquid employed, the pressure exerted on the fluid, and the amount of fluid which it is desired to emit.

Fluid having a low freezing point or temperature may be supplied to chamber 23 from a reservoir or tank 27 through connected conduits 28 and 29 in which there may be provided a spring pressed check valve (not shown). The latter conduit extends freely through the central bore in hollow shaft 9, the same being supported at one point by a cross member 30 in housing 5 and at the forward end thereof by a plurality of packing washers 31 which, together with washers 19, prevent leakage from chamber 23 into the rest of the mechanism. Washers 31 may be held in position by a nut 17. Pressure, such as may be effected by compressed air, for example, may be exerted upon the fluid in reservoir 27 through a conduit 32 from any suitable source (not shown). A suitable valve 33 may be provided in conduit 32 for controlling the pressure in reservoir 27 and, hence, the supply of fluid to chamber 23. In one propeller adapted for use in measuring wind velocity, an anti-freeze fluid constituted by a mixture of 15 per cent glycerine and 85 per cent alcohol has been found desirable. Any number of well-known anti-freeze liquids may, however, be employed.

The rotation of propeller 21, 22 by wind acting on the blades thereof is transmitted to shaft 9 and thence to any suitable means for measuring the angular velocity of the latter, which velocity is a measure of the wind velocity relative to propeller blades 21. In the form shown, said means comprises a circuit breaker mechanism generally indicated at 34, the contacts 35 of which are adapted to be opened at intervals depending upon the angular velocity of shaft 9 by a cam or eccentric 36 mounted on said shaft. The circuit breaker contacts are connected in an electrical circuit by means of leads 37 and a plug and socket connection, partially shown at 38, which is adapted to control an indicating instrument 39. The latter may be constituted by any of several well-known constructions adapted to measure the velocity of rotating parts and may be calibrated to indicate the velocity of the wind driving propeller unit 21, 22. Since instrument 39 does not, per se, constitute a part of the present invention and since suitable instruments for this purpose are well-known in the art, a detailed description thereof is believed to be unnecessary.

In the embodiment illustrated in Fig. 4, the bases of the leading edges 26' of the propeller blades 21' are at the foremost point of nose portion 22' of the propeller unit. A single orifice 24', or more if desired, may be provided in nose portion 22' and orifices 25' may extend from the leading edges of propeller blades into fluid chamber 23', which is formed by nose portion 22' and a hub member 15' corresponding to member 15 of Fig. 1. With this construction, any ice which may accumulate on the surface of nose 22' during severe operating conditions is not an annular formation, since it is necessarily divided by blades 21' and, hence, more easily cast off by the action of centrifugal force and wind pressure. Those portions of the embodiment of Fig. 4 within shell 5' may be substantially identical with the corresponding parts shown in Fig. 1 and heretofore described.

There is thus provided a novel propeller unit which is adapted for operation at high altitudes and in cold, damp atmosphere without being materially hindered by the formation of ice thereon. The novel rotatable portion of the structure provided is so shaped as to minimize the possibility of ice forming thereon or clinging thereto and to facilitate throwing off ice which does form under severe operating conditions. The structure is also novelly combined with means for coating the surfaces subjected to ice formations with an anti-freeze fluid which materially retards the formation of ice. Additionally, simple, yet rugged and inexpensive means are provided whereby wind velocity or the air speed of an aircraft may be ascertained with comparative accuracy under all operating conditions.

Although only two embodiments of the invention have been illustrated and described, it is to be expressly understood that the same are illustrative only and that the invention is not limited thereto. For example, the novel propeller unit may be employed in combination with other types of measuring and indicating instruments than those shown. Various other changes, particularly in the design and arrangement of parts illustrated, may be made without departing from the spirit and scope of the invention, as will now be apparent to those skilled in the art. For a definition of the limits of the invention, reference is had primarily to the appended claims.

What is claimed is:

1. Apparatus of the class described comprising a stationary support, a propeller unit rotatably mounted on said support, said unit comprising a plurality of blades and a centrally disposed hub portion having a hemispherically-shaped nose, the latter being hollow to provide a fluid chamber and said blades being curved rearwardly throughout the entire length thereof, and means for supplying anti-freeze liquid through said hub portion to said chamber under pressure, said blades and nose portion having openings therein communicating with said chamber for emitting said liquid adjacent the forward point of said nose and adjacent the leading edges of said blades near the bases thereof.

2. Apparatus of the class described comprising stationary supporting means, a propeller unit rotatably mounted on said supporting means, said unit comprising a plurality of propeller blades and a centrally disposed hub portion having a streamlined nose surface, said hub portion having a fluid chamber therein and the leading edges of said blades being curved rearwardly throughout the entire length thereof, and means for supplying a liquid having a low freezing temperature through said hub portion to said chamber under pressure, said unit having openings therein communicating with said chamber for emitting said liquid to the outer surface of said nose and adjacent the base of the leading edges of said blades.

3. Apparatus of the class described comprising supporting means, a propeller unit rotatably mounted on said supporting means, said unit comprising a plurality of blades and a centrally disposed hub portion, the latter having a fluid chamber therein and said blades being inclined rearwardly from said hub portion throughout the entire length thereof, a stationary conduit extending centrally through said unit, and means for supplying anti-freeze liquid through said conduit into said chamber, said hub portion having orifices therein for emitting said liquid to the outer surface of said unit.

4. In an apparatus of the class described, a propeller unit comprising a plurality of blades, said blades having an outward and rearward curvature throughout the entire lengths thereof, a fluid chamber centrally mounted on said unit in front of said blades, the forward wall of said chamber constituting a streamlined nose for said unit, said wall having a plurality of orifices therein for the emission of a fluid having a low freezing point from said chamber to the external surfaces of said unit, and means for maintaining a supply of said fluid in said chamber.

5. Apparatus of the class described comprising supporting means, a propeller unit rotatably mounted on said supporting means including a plurality of propeller blades and a centrally disposed hub portion, the latter having a fluid chamber therein, said blades being formed to have a sweepback of from 30° to 45° with the leading edges thereof shaped in the arc of a circle, and means for supplying an anti-freeze liquid to said chamber, the forward wall of said unit having one or more orifices therein communicating with said chamber for emitting said liquid, at least one of said orifices being located at the base of each of said blades adjacent the leading edge thereof to emit liquid on said leading edge.

6. In wind driven apparatus for actuating an indicating instrument, supporting means, a propeller unit rotatably mounted on said supporting means including a plurality of propeller blades and a centrally disposed hub portion, the latter having a fluid chamber therein connected by orifices to the leading surfaces of said unit, at least one of said orifices being located at the base of each blade adjacent and in front of the leading edge of said blade, each of said blades being formed to have a sweepback of from 30° to 45° through the entire length thereof, and means for supplying anti-freeze liquid to said chamber for emission through said orifices.

JOSEPH BERGE.